(12) United States Patent
Amselem et al.

(10) Patent No.: US 11,106,910 B2
(45) Date of Patent: Aug. 31, 2021

(54) DEVICE AND METHOD FOR SIMULATING THE ESTIMATION OF A LAG IN PRODUCING SATELLITE IMAGES OF THE EARTH

(71) Applicant: Airbus Defence and Space SAS, Toulouse (FR)

(72) Inventors: Cécilia Amselem, Toulouse (FR); Eric Villeméjeanne, Toulouse (FR); Jean-Christophe Angulo, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 0 days.

(21) Appl. No.: 16/634,287

(22) PCT Filed: Jul. 20, 2018

(86) PCT No.: PCT/EP2018/069707
§ 371 (c)(1),
(2) Date: Jan. 27, 2020

(87) PCT Pub. No.: WO2019/020499
PCT Pub. Date: Jan. 31, 2019

(65) Prior Publication Data
US 2020/0160029 A1     May 21, 2020

(30) Foreign Application Priority Data
Jul. 27, 2017  (FR) ........................ 1757161

(51) Int. Cl.
*G06K 9/00* (2006.01)
(52) U.S. Cl.
CPC ................... *G06K 9/0063* (2013.01)
(58) Field of Classification Search
None
See application file for complete search history.

(56) References Cited

U.S. PATENT DOCUMENTS

2016/0363696 A1* 12/2016 Dao ..................... G01W 1/10
2020/0064515 A1*  2/2020 Kuhns .................. G06N 20/00
2020/0355846 A1* 11/2020 Mecikalski ........... G01W 1/10

FOREIGN PATENT DOCUMENTS

FR       3 011 322     4/2015
FR       3 039 728     2/2017
WO    2011-089477     7/2011

OTHER PUBLICATIONS

French International Search Report for PCT/EP2018/069707 with English Translation, dated Oct. 19, 2018, 8 pages.
(Continued)

*Primary Examiner* — Idowu O Osifade
(74) *Attorney, Agent, or Firm* — Nixon & Vanderhye P.C.

(57) ABSTRACT

A method for simulating the estimation of a time to acquire satellite images associated with at least one predetermined area of the Earth, by at least one Earth observation satellite having an optical imaging system, the predetermined area being previously divided into a grid of cells, the acquisition being scheduled to be triggered starting on an analysis start date is disclosed having the steps of: (a) conducting an inventory of the cells planned to be overflown by the satellite on a current iteration date, on the basis of the orbital characteristics of the satellite on the current iteration date, thus obtaining candidate cells, (b) identifying among the candidate cells, on the basis of a mission plan of the satellite, those cells for which acquisition of at least one satellite image is scheduled, thus obtaining scheduled cells, (c) obtaining at least a first cloudiness value for each of the scheduled cells, (d) identifying, among the scheduled cells, those for which the first associated cloudiness value is above a predetermined validation threshold value, thus obtaining validated cells.

11 Claims, 4 Drawing Sheets

(56) References Cited

OTHER PUBLICATIONS

French Search Report for Application No. FR1757161, dated Jun. 15, 2018, 2 pages.
Welch et al., "Aster as a Source for Topographic Data in the Late 1990's", IEEE Transaction on Geoscience and Remote Sensing, vol. 36, No. 4, Jul. 1, 1998, pp. 1282-1289.

* cited by examiner

DEVICE AND METHOD FOR SIMULATING THE ESTIMATION OF A LAG IN PRODUCING SATELLITE IMAGES OF THE EARTH

CROSS REFERENCE TO RELATED APPLICATIONS

The present application is a National Phase of International Application Number PCT/EP2018/069707 filed Jul. 20, 2018, which designated the U.S. and claims priority benefits from French Patent Application Number No. FR 1757161 filed Jul. 27, 2017, the entire contents of each of which are hereby incorporated by reference.

TECHNICAL FIELD

The present invention relates to the field of satellite remote sensing. More specifically, it relates to a device and a method for simulating the estimation of a time to acquire satellite images of the Earth by optical acquisition techniques.

PRIOR ART

The circumterrestrial space contains a number of Earth observation satellites which enable monitoring parameters of the Earth system (oceans, atmospheres, natural resources, impacts of human activities, etc.), obtaining maps, or providing information for the defense of countries. To achieve this, these systems are based on a set of satellite imaging data, meaning a set of measurements carried out using instruments on board satellites.

Due to the increasingly widespread use of Earth observation, requests for satellite imagery are growing every day. However, some satellite resources are limited, such as the number of images that can be captured while flying over a region of the globe or the capacities for data transmission to the ground. It is therefore necessary to schedule the use of these resources over the long term while still meeting satellite imagery demands.

The time required to implement a request for satellite imagery (time-to-acquire) is one of the elements enabling the creation of such a schedule. Such a time-to-acquire corresponds to the time elapsed between the activation of a satellite imagery request and the delivery of the imagery results to the client. In the field of optical observation of the Earth, satellite imagery is dependent on weather conditions. Indeed, clouds present in the acquisition area can hide the object or territory one wishes to observe. However, it is well known that there is great uncertainty in long-term weather forecasts, which makes it difficult to determine the time-to-acquire for a specific satellite imagery request. In practice, it is common to estimate the time-to-acquire based essentially on the experience of the operator of the Earth observation system as well as his knowledge of the climatology of the area to be acquired.

The subjective nature of this estimate is difficult to reconcile with the ever-increasing demands for reliability and accuracy required by customers in satellite remote sensing systems.

SUMMARY OF THE INVENTION

The present invention therefore aims to overcome such disadvantages by providing a method and a device for estimating the time required to satisfy a request for satellite imagery associated with a predetermined area of the Earth, by at least one Earth observation satellite comprising an optical imaging system.

The invention relates to a method for simulating the estimation of a time to acquire satellite images associated with at least one predetermined area of the Earth, by at least one Earth observation satellite comprising an optical imaging system, the predetermined area being previously divided into a grid of cells, the acquisition being scheduled to be triggered starting on an analysis start date. The method is noteworthy in that it comprises the steps of:
(a) selecting a plurality of cells of the grid which are planned to be overflown by the satellite on a current iteration date, based on the orbital characteristics of the satellite on the current iteration date, so as to obtain candidate cells, the current iteration date corresponding to a date around the analysis start date within the course of a year prior to the year associated with the analysis start date,
(b) identifying among the candidate cells, based on a mission plan of the satellite, those for which acquisition of at least one satellite image is scheduled, thus obtaining scheduled cells,
(c) obtaining at least a first cloudiness value for each of the scheduled cells, the first cloudiness value corresponding to a weather observation and/or forecast respectively observed on the current iteration date or predicted for the current iteration date,
(d) identifying, among the scheduled cells, those for which the first associated cloudiness value is above a predetermined validation threshold value, thus obtaining validated cells,
(e) repeating steps (a) to (d) one or more times until each of the cells of said grid is comprised in the validated cells, taking into consideration in each iteration the cells not identified as validated and a period following the current iteration date considered in the previous iteration,
(f) determining the time to acquire satellite images, based on the number of iterations carried out in step (e).
  Preferably, step (a) further comprises the steps of:
  obtaining at least a second cloudiness value for each of the candidate cells, the second cloudiness value corresponding to a weather observation and/or a weather forecast respectively observed on the current iteration date or predicted for the current iteration date, and
  identifying, among the candidate cells, those for which the associated second cloudiness value is above a predetermined selection threshold value that is different from the predetermined validation threshold value.

The predetermined selection threshold value and the predetermined validation threshold value may preferably correspond to a clear sky percentage threshold value. Preferably, the validation threshold value is greater than the selection threshold value.

Preferably, step (f) further comprises the step of determining at least one statistical quantity and/or at least one posterior probability based on a plurality of times to acquire satellite images determined in step (d).

The invention also relates to a computer program product which is arranged so as to execute a method according to the invention when executed by a computer; the computer program optionally being stored on a computer-readable medium.

Another object of the invention is a device for simulating the estimation of a time to acquire satellite images associated with at least one predetermined area of the Earth, by at least one Earth observation satellite comprising an optical imaging system, the predetermined area being previously divided into a grid of cells, the acquisition being scheduled to be triggered starting on an analysis start date, the device comprising:

a memory configured to store:

the grid of cells associated with the predetermined area, the orbital characteristics of the satellite at a current iteration date, the current iteration date corresponding to a date around the analysis start date in a year prior to the year associated with the analysis start date, and at least a first cloudiness value for each of the cells of the grid, the first cloudiness value corresponding to a weather observation and/or forecast respectively observed on the current iteration date or predicted for the current iteration date, a processor coupled to the memory and configured to select a plurality of cells of the grid that are planned to be overflown by the satellite on the current iteration date based on the orbital characteristics of the satellite on the current iteration date, thus obtaining candidate cells, the processor being further configured for:

(a) identifying among the candidate cells, based on a mission plan of the satellite, those for which acquisition of at least one satellite image is scheduled, (b) identifying among the candidate cells, those for which the first associated cloudiness value is above a predetermined validation threshold value, thus obtaining scheduled cells, (c) repeating operations (a) and (b) one or more times until each of the cells of said grid is comprised in the validated cells, taking into consideration in each iteration the cells not identified as validated and a period following the current iteration date considered in the previous iteration, (d) determining the time to acquire satellite images based on the number of iterations carried out during operation (c).

Preferably, the memory is further configured to store a second cloudiness value for each of the candidate cells, the second cloudiness value corresponding to a weather observation and/or a weather forecast respectively observed on the current iteration date or predicted for the current iteration date, and the processor is further configured to identify, among the candidate cells, those for which the associated second cloudiness value is above a predetermined selection threshold value that is different from the predetermined validation threshold value, thus obtaining the candidate cells.

The predetermined selection threshold value and the predetermined validation threshold value may preferably correspond to a clear sky percentage threshold value. Preferably, the validation threshold value is greater than the selection threshold value.

Preferably, the processor is further configured to determine, during operation (d), at least one statistical quantity and/or at least one posterior probability based on a plurality of times to acquire satellite images determined during operation (c).

BRIEF DESCRIPTION OF DRAWINGS

Other features and advantages of the invention will be better understood by reading the following description and referring to the accompanying drawings, given by way of illustration and in no way limiting.

For clarity, the elements shown are not to scale relative to each other unless otherwise stated.

DESCRIPTION OF EMBODIMENTS

In the context of the description, the term "Earth observation system" is understood to mean a system comprising satellite constellations such as Landsat, SPOT, or even Pléiades. In addition, it is specified that the invention relates to optical satellite systems for which the acquisition of images of the Earth is dependent on solar illumination reflected by the ground. These systems use passive sensors to record the solar radiation reflected by the ground, in various wavelengths.

The general principle of the invention is based on the observation that long-term weather forecasts are not very reliable. It is therefore inadvisable to rely on these to estimate the time required to acquire satellite images associated with a predetermined area of the Earth. Thus, according to the invention, it is proposed to carry out one or more simulations of the process of acquiring satellite images associated with a predetermined area of the Earth. The image acquisition process covers the period extending from the activation of a request for satellite imagery submitted by a client until the providing of imaging results to that client. In the invention, this involves carrying out each simulation based on past weather observations and/or forecasts. In this manner, it is possible to determine the time that the Earth observation system would have taken to acquire satellite images of the predetermined area of the Earth during the prior period concerned. This amount of time determined based on the past can then be used as a basis for estimating the future time to acquire satellite images.

Figure 1:
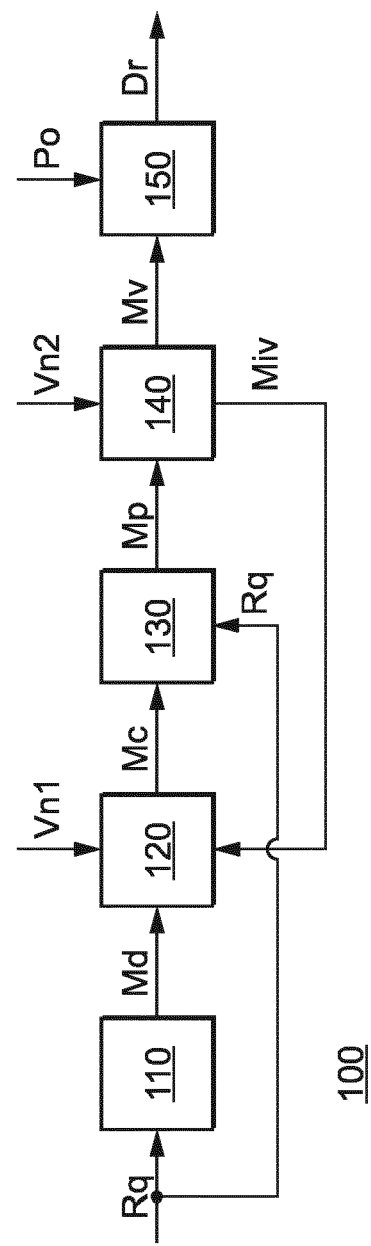
FIG. 1 shows a flowchart according to the invention.

FIG. 1 illustrates a method 100 functionally describing the general principle of the simulator according to the invention.

In the example of FIG. 1, a request for satellite imagery Rq similar to the requests received and processed in satellite mission centers is considered to have been received. However, it is also possible that several concurrent requests Rq are received. A request Rq is scheduled to be triggered/activated on an analysis start date. "Date" is understood to mean the indicated day, month, and year.

The request Rq defines at least one predetermined area of the Earth in which the satellite imagery acquisition is to be carried out. In one example, the predetermined area of the Earth is defined by one or more polygons whose vertices correspond to geographic positions on the terrestrial globe. In one particular implementation, the request Rq is intended to be associated with a predetermined Earth observation system which is configured to fly over the predetermined area of the Earth.

Figure 2:
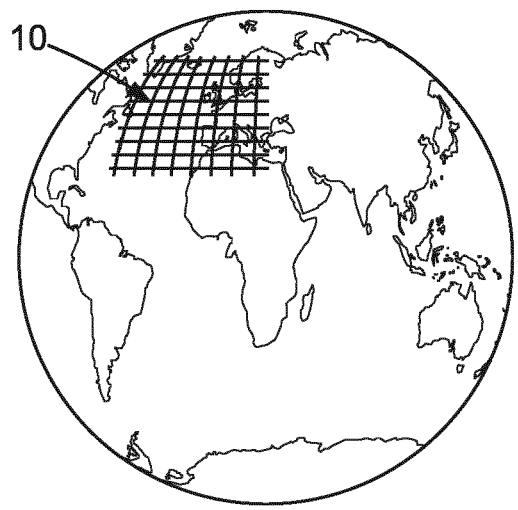
FIG. 2 shows a grid of cells over a portion of the Earth.

Next, in step 110, called the gridding step, the predetermined area of the Earth is divided into a grid composed of cells in order to obtain the requested cells Md. Grid is understood to mean, for example, a horizontal and vertical grid. Cell is understood to mean any of the basic quadrilaterals that compose the grid. For example, each cell of the grid has a square or square-like shape, for example a rectangular shape. FIG. 2 illustrates an example of a grid 10 of cells superimposed on a portion of the Earth. In a first example, the grid according to the invention is in the form of an image file in which each cell associated with the predetermined area is georeferenced. In a second example, the grid according to the invention is in the form of a text file in which each line describes at least one cell of the grid with georeferencing information associated with the predetermined area.

In a step 120, called the inventory step, what we will call candidate cells Mc are determined among the requested cells Md. For this purpose, the orbital characteristics of at least one observation satellite configured to fly over the predetermined area of the Earth are used at a current iteration date in order to determine, among the requested cells Md, those which would be overflown by the observation satellite on the current iteration date.

The term orbital characteristics of a satellite is understood to mean conventional characteristics such as the altitude, number of orbits per day, or inclination of the orbit. Other parameters of the system may also be defined in conjunction with the orbital characteristics of a satellite, such as the list of ground stations allowing the downloading of images acquired by the satellite, the resolution of the imaging system, the spectral bands supported by the imaging system of the satellite, the swath width of the optical instrument, or the angle of incidence limits authorized for capturing images.

The current iteration date is understood to mean the date taken into account during an iteration of a simulation of the time to acquire for the request Rq. The current iteration date is located around the start date in a year prior to the year associated with the start date of the request Rq. The term "previous year" or "prior year" is understood to mean a year preceding the year associated with the analysis start date of the request Rq. For example, it may be two, five, eight, twelve, twenty, or even thirty years before the year associated with the start date of the request Rq. During a simulation according to the invention, the current iteration date is initialized to an initialization date of the simulation. The initialization date of the simulation is determined based on the analysis start date of the request Rq. In one example, we can consider the analysis start date of the request Rq to be scheduled for dd/mm/YYYY where dd corresponds to the day, mm to the month, and YYYY to the year concerned. In this example, we can also consider that the previous year to be taken into account is located five years before the year associated with the analysis start date of the request Rq. In this case, the initialization date of the simulation considered corresponds to the date dd/mm/(YYYY-5). Then, during a simulation, the current iteration date is incremented according to at least one predetermined criterion. In an alternative of the example, several simulations are carried out, each simulation concerning a given previous year. In this case, if eight simulations are carried out over the last eight years preceding the analysis start date of the request Rq, then the initialization date of each simulation will respectively correspond to the dates dd/mm/(YYYY-1), dd/mm/YYYY-2), dd/mm/(YYYY-3), dd/mm/(YYYY-4), dd/mm/(YYYY-5), dd/mm/(YYYY-6), dd/mm/(YYYY-7), and dd/mm/(YYYY-8).

In a first particular implementation of step 120, only the requested cells Md which are scheduled to be overflown during the day can be considered as candidate cells Mc.

In a second particular implementation of step 120, only the requested cells Md which are scheduled to be overflown while covered by few or no clouds can be considered as candidate cells Mc. To do this, each requested cell Md is associated with a first cloudiness value Vn1. Thus, only the requested cells Md which are scheduled to be overflown and for which the first cloudiness value is above a selection threshold value can be considered as candidate cells Mc.

In one example, the predetermined selection threshold value is a cloudiness threshold such as a clear sky percentage threshold value.

Conventionally, cloudiness is understood to mean the portion of the sky covered by all or part of the clouds at each cell of the grid 10. For example, it may be an ERA-Interim data file produced by the ECMWF (European Center for Medium-Term Weather Forecasts). Such a file, according to the invention, may comprise a cloudiness value for each of the requested cells Md, and for one or more dates within one or more years preceding the year associated with the analysis start date.

In a first implementation, the first cloudiness value corresponds to a weather observation observed on the current iteration date. In an example of the first implementation, the weather observation is made during a year prior to the year associated with the analysis start date, the month bearing the same name and the day being the same day of the month as the month and day of the start date.

In a second implementation, the first cloudiness value corresponds to a weather forecast for the current iteration date. In an example of the second implementation, the forecast was made for the same date as the predefined start date during at least one year prior to the year associated with the analysis start date.

In an example of the second particular implementation of step 120, the candidate cells Mc are prioritized according to at least one predetermined priority criterion. For example, a higher priority can be given to the candidate cells Mc whose first cloudiness value Vn1 is low. In another example, the candidate cells Mc can be prioritized according to a predetermined priority value. The predetermined priority value can be determined in the request Rq or in step 110. One will note that it is also possible to use several predetermined priority criteria in a combined or independent manner.

In a step 130 called the mission plan calculation step, what we will call scheduled cells Mp are determined among the candidate cells Mc. To do this, the generation of a mission plan of the observation satellite considered is simulated based on the candidate cells Mc and on the request Rq. Thus, only the candidate cells Mc which are scheduled to be acquired by the satellite considered, can be considered as scheduled cells Mp. "Mission plan" is understood to mean the programming plan of the satellite considered, which is uploaded/sent to the satellite via the control center and which makes it possible to capture images of the predetermined area of the Earth according to an order and capture characteristics provided in the plan. For example, the priority associated with each candidate cell Mc can be taken into account when developing the mission plan. It is known that the mission plan takes into account kinematic constraints related to the platform and also integrates the plans for dumps to the various receiving stations. Such a mission plan can be obtained by a mission plan generator of known type, for example as described in application FR3039728. In the invention, it is provided to take the satellite load into account when establishing the mission plan. Satellite load is understood to mean a plurality of requests Rq processed concurrently by the satellite at a given moment. In the context of a simulation, we can consider the current and/or future load of the Earth observation satellite concerned.

In a step 140, called the validation step, the validation of the acquired images is simulated once downloaded to the ground. For this, on the current iteration date, what we will call validated cells Mv are determined among the scheduled cells Mp. In practice, only the scheduled cells Mp which have not been hidden by clouds can be considered as validated cells Mv. To do this, associated with each scheduled cell Mp is a second cloudiness value Vn2. Thus, only the scheduled cells Mp whose second cloudiness value is above a validation threshold value can be considered as validated cells Mv. In one example, the predetermined validation threshold value is a clear sky percentage threshold value. For example, a clear sky percentage threshold value between 50% and 100% can be envisaged, more preferably between 60% and 90%. In one particular implementation, the predetermined validation threshold value is greater than the predetermined selection threshold value.

The invalidated cells MiV in step 140 are reintroduced into an iteration loop formed by steps 120, 130, and 140, until each of the requested cells Md is included in the set of validated cells Mv. To do this, in each iteration of the simulation, a period following the current iteration date considered in the previous iteration is taken into account. In one example, the next period of the current iteration date considered in the previous iteration corresponds to the day after the current iteration date considered in the previous iteration. However, other periods may be envisaged, for example a predetermined period until the next satellite orbit, one or more days, weeks, months, or any other suitable duration.

Finally, in a step 150, for a simulation that has reached completion after one or more iterations, the time Dr required to acquire satellite images is determined based on the number of iterations performed during the simulation. In one example, this is at least the elapsed period between the initialization date of the simulation considered and the completion date of the simulation considered. In this example, other operational periods Po may also be added, such as the period necessary for the preparation and delivery of the imaging results to the client. This may in particular include image processing operations performed according to the wishes of the client.

Figure 3:
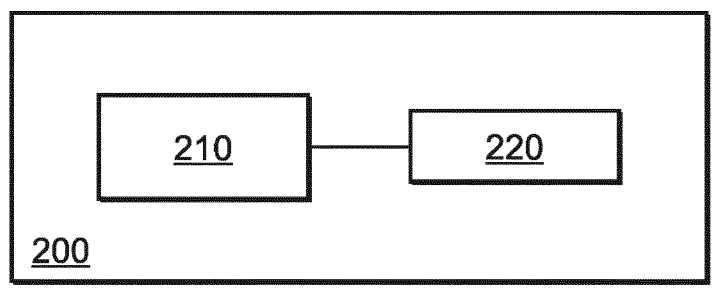
FIG. 3 shows a schematic functional view of an estimation device according to one implementation of the invention.

The example of FIG. 3 illustrates a particular implementation of the method 100 of FIG. 1. FIG. 3 shows a device 200 for simulating the estimation of the time to acquire satellite images associated with a predetermined area of the Earth. The device 200 comprises a processor 210 and a memory 220 which are mutually coupled.

The memory 220 is configured to store a grid associated with the predetermined area of the Earth defined in the request Rq. In one particular implementation, the memory 220 is configured to store a plurality of grids, each being associated with a predetermined area of the Earth defined in the request Rq. In another particular implementation, the memory 220 is configured to store a grid associated with a plurality of predetermined areas of the Earth defined in the request Rq. In addition, the memory 220 is also configured to store the orbital characteristics of at least one observation satellite configured to fly over the predetermined area of the Earth, and doing so at least on the current iteration date of the simulation. Finally, the memory 220 is configured to store the first cloudiness value Vn1 and the second cloudiness value Vn2 for each of the requested cells Md.

The processor 210 is configured to implement steps 110, 120, 130, 140, and 150 of the method 100, according to the meteorological data available. In general, the invention is intended to use a weather observation observed on the current iteration date and/or a weather forecast predicted for the current iteration date In a first implementation, only past weather forecasts are available. In this case, the processor 210 is configured to use the past weather forecasts in step 120.

In a second implementation, only past weather observations are available. In this case, the processor 210 is either configured to use the past weather observations in steps 120 and 140, or to use the past weather observations in step 140.

In a third implementation, past weather observations and forecasts are available. In this case, the processor 210 is configured to use the past weather forecasts in step 120 and to use the weather observations in step 140.

In order to better understand the operation of the device 200, let us consider the example of a simulation in relation to FIGS. 4a, 4b, 4c, 4d, and 4e. In this example, the processor 210 is configured according to the second alternative of the second implementation, as described above. In practice, only past weather observations are available, which are used by the processor 210 in the implementation of step 140.

Figure 4A:
FIGS. 4a, 4b, 4c, 4d, and 4e show an example implementation according to the invention.
Figure 4B:
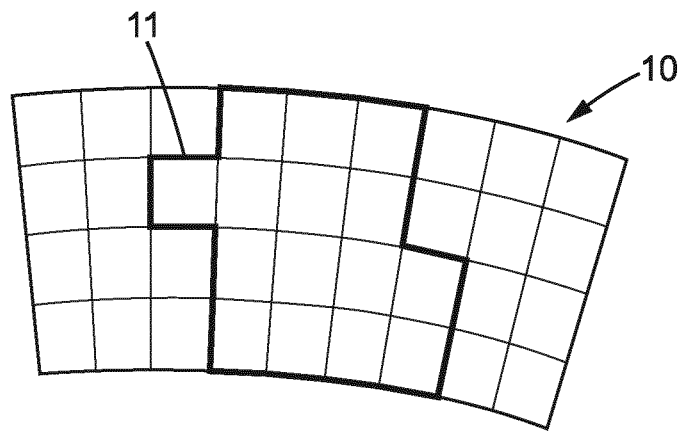

First, it is assumed that a file comprising a request Rq for satellite imagery associated with a predetermined area of the Earth is received at a satellite mission center. FIG. 4a, together with FIG. 3 presented above, illustrates a predetermined area 20 defined by the request Rq. Next, it is also assumed that the analysis start date of the request Rq is scheduled for dd/mm/YYYY where dd corresponds to the day, mm to the month, and YYYY to the year concerned. It is also assumed that the memory 220 stores the orbital characteristics of at least one observation satellite configured to fly over the predetermined area of the Earth 20, and to do so at each current iteration date of the simulation. Lastly, it is assumed that the memory 220 stores a second cloudiness value Vn2 for each cell Md requested by the request Rq. In this example, we also consider that the second cloudiness value Vn2 was observed on date dd/mm/(YYYY-T) where T corresponds to an integer. In this example T is considered to be 10, so the memory 220 stores at least one second cloudiness value Vn2 observed ten years before the analysis start date dd/mm/YYYY, in other words on date dd/mm/(YYYY−10). The initialization date of the simulation is thus dd/mm/(YYYY−10).

During operation, the processor 210 first implements step 110 in order to obtain the requested cells Md. The bold line 11 in FIG. 4b outlines all the requested cells Md which result from subdividing the predetermined area 20.

Next, as indicated above, the processor 210 implements step 120 in order to obtain the candidate cells Mc. It is then a question of identifying which cells among the requested cells Md would be overflown by the observation satellite on the current iteration date.

Then, the processor 210 implements step 130 in order to obtain the scheduled cells Mp. It is then a question of obtaining the cells of the grid 11 which are planned to be acquired by the observation satellite on date dd/mm/(YYYY−10).

Thereafter, the processor 210 implements step 140 in order to obtain the validated cells Mv. It is then a question of identifying which cells among the scheduled cells have a second cloudiness value Vn2 above a predetermined validation threshold value. The hashing in FIG. 4c indicates the cells of the grid 11 which would have been validated on date dd/mm/(YYYY−10).

Figure 4C:
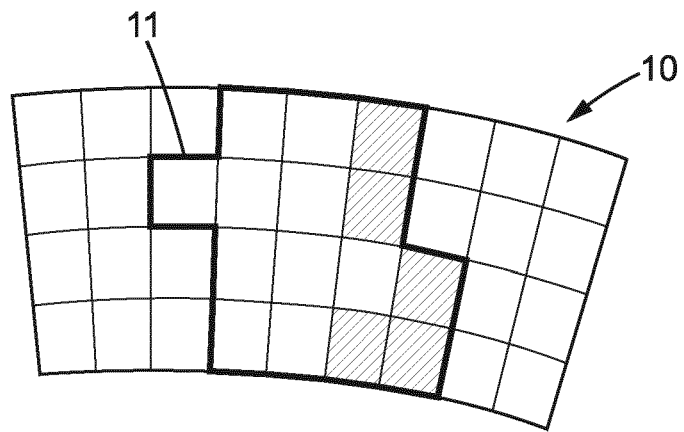

According to FIG. 4c, only a portion of the cells of the grid 11 would have been validated on date dd/mm/(YYYY−

10), so the processor 210 needs to continue the simulation using the invalidated cells Miv during the implementation of step 140 by the processor 210. To do so, the processor 210 iterates a loop of steps 120, 130, 140, 150.

However, in the invention, during the execution of a subsequent iteration of the simulation, the processor 210 is configured to take into consideration the period following the current iteration date considered in the previous iteration.

In the example of FIG. 4, the processor 210 takes into consideration the day after the current iteration date considered in the previous iteration. Thus, during the second iteration, the processor 210 selects on date (dd+1)/mm/(YYYY−10) the scheduled cells Mp among the invalidated cells Miv. Then, the processor 210 identifies among the scheduled cells Mp those for which the second associated cloudiness value, on date (dd+1)/mm/(YYYY−10), is above the predetermined validation threshold value.

Figure 4D:
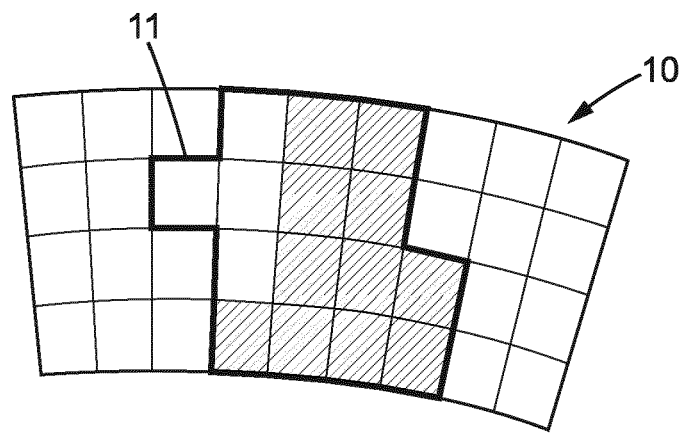

The hashing in FIG. 4d indicates the cells which would have been validated on date (dd+1)/mm/(YYYY−10). According to FIG. 4d, only some of the cells of the grid 11 would have been validated on date (dd+1)/mm/(YYYY−10), so the processor 210 needs to continue the simulation. Thus, in the example of FIG. 4, for the third iteration of the simulation, the processor 210 takes into account the current iteration date (dd+2)/mm/(YYYY−10). Similarly, for the fourth iteration of the simulation, the processor 210 takes into account the current iteration date (dd+3)/mm/(YYYY−10). And so on until completion of the current simulation, in other words until each of the requested cells Md is included in the validated cells Mv.

Figure 4E:
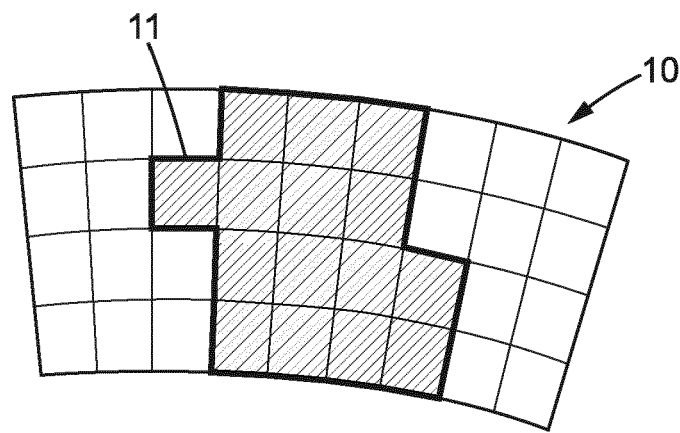

The hashing in FIG. 4e indicates the cells that would have been validated at the end of the completion of a simulation.

When all the requested cells Md are comprised in the validated cells, the processor 210 implements step 150 in order to estimate the time to acquire for the request Rq, for the past year considered.

In one example, the time to acquire for the request Rq corresponds to at least the period elapsed from the initialization date of the simulation dd/mm/(YYYY-T) until the date when all the cells would have been validated. For example, if T is equal to 10 as in the above example and the simulation completion date is (dd+5)/mm/(YYYY−10), then the time to acquire the satellite images is six days. In another example, if T is equal to 10 as in the above example and the simulation completion date is (dd+3)/(mm+2)/(YYYY-10), then the time to acquire the satellite images is two months and four days. We can add other operational times to this time, such as those necessary to carry out image processing operations, upload the mission plan from the mission center to the satellite, or download the images acquired by the observation satellite to the stations on the ground.

In particular, it is planned to carry out a simulation for each of the years prior to the year associated with the analysis start date. In the example in FIG. 4, this could be a question of carrying out a simulation for each of the ten years prior to the year of the start date of the request Rq. In one particular implementation, the processor 210 is configured to carry out a plurality of simulations in parallel.

In the case where several simulations are carried out, the processor 210 is further configured to determine at least one statistical quantity and/or at least one posterior probability, based on the times-to-acquire obtained during each of the simulated years.

In one example, the statistical quantity includes the calculation of one of the following quantities, taken individually or in any possible combination: an average, a weighted average, a median, a number of occurrences above or below a reference value, a maximum, a minimum, a standard deviation, or the difference between a maximum and a minimum.

Figure 5:
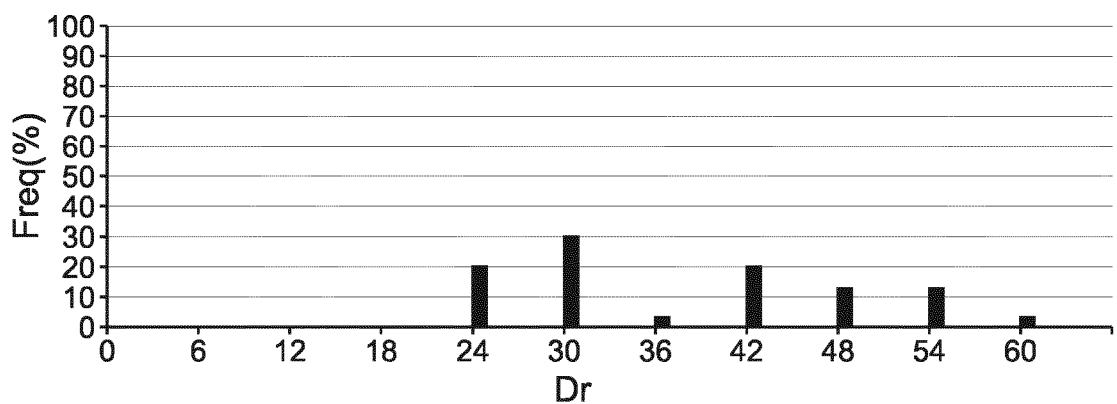
FIG. 5 shows a distribution of the time-to-acquire simulated for several years for an example request for satellite imagery.

In another example, the posterior probability is determined on the basis of the statistical quantity or a series of statistical quantities. Thus, for example, it is possible to estimate the probability of acquiring the satellite images associated with an imagery request, for one or more given times-to-acquire. In another example, it is possible to determine the times-to-acquire for an imaging request for which the posterior probability is greater than a predetermined time-to-acquire determination threshold. FIG. 5 illustrates, in histogram form, a distribution of the time-to-acquire associated with a request Rq, and does so for a plurality of simulated years. The histogram of FIG. 5 includes the time-to-acquire Dr expressed in days on the abscissa and includes the frequency of occurrence of the times-to-acquire, expressed as a percentage. Thus, in FIG. 5, we can see that the probability of carrying out the request Rq in thirty days is greater than the probability of carrying it out in sixty days. In the example of FIG. 5, a time-to-acquire determination threshold set at 20% makes it possible to identify the period of thirty days as being the most likely for the completion of the request Rq.

In addition, it is also conceivable to perform a simulation only for those years prior to the year associated with the start date which have meteorological similarities with the year associated with the start date. For example, it is known that climatic phenomena such as El Niño or La Niña are characterized by a particular chronology which can be predicted by coupling the atmosphere and the surface ocean.

In the claims, the term "comprise" does not exclude other elements or other steps. The various features presented and/or claimed may advantageously be combined. Their presence in the description or in different dependent claims does not exclude this possibility. Finally, the references in the drawings should not be understood as limiting the scope of the invention.

The invention claimed is:

1. A method for simulating the estimation of a time to acquire satellite images associated with at least one predetermined area of the Earth, by at least one Earth observation satellite comprising an optical imaging system, the predetermined area being previously divided into a grid of cells, the acquisition being scheduled to be triggered starting on an analysis start date, the method comprising the steps of:

(a) selecting a plurality of cells of the grid which are planned to be overflown by the satellite on a current iteration date, based on the orbital characteristics of the satellite on the current iteration date, so as to obtain candidate cells, the current iteration date corresponding to a date around the analysis start date within the course of a year prior to the year associated with the analysis start date, (b) identifying among the candidate cells, based on a mission plan of the satellite, those for which acquisition of at least one satellite image is scheduled, thus obtaining scheduled cells, (c) obtaining at least a first cloudiness value for each of the scheduled cells, the first cloudiness value corresponding to a weather observation and/or forecast respectively observed on the current iteration date or predicted for the current iteration date, (d) identifying, among the scheduled cells, those for which the first associated cloudiness value is above a predetermined validation threshold value, thus obtaining validated cells, (e) repeating steps (a) to (d) one or more times until each of the cells of said grid is comprised in the validated cells, taking into consideration in each iteration the cells not identified as validated and a period following the current iteration date considered in the previous iteration, (f) determining the time to acquire satellite images, based on the number of iterations carried out in step (e).

2. The method according to claim 1, wherein:

step (a) further comprises the steps of:

obtaining at least a second cloudiness value for each of the candidate cells, the second cloudiness value corresponding to a weather observation and/or a weather forecast respectively observed on the current iteration date or predicted for the current iteration date, and, identifying, among the candidate cells, those for which the associated second cloudiness value is above a predetermined selection threshold value that is different from the predetermined validation threshold value.

3. The method according to claim 1, wherein the predetermined selection threshold value and the predetermined validation threshold value correspond to a clear sky percentage threshold value.

4. The method according to claim 3, wherein the validation threshold value is greater than the selection threshold value.

5. The method according to claim 1, wherein step (f) further comprises the step of determining at least one statistical quantity and/or at least one posterior probability based on a plurality of times to acquire satellite images determined in step (d).

6. One or more computer storage devices having computer-executable instructions, that when executed by a processor, is arranged to execute a method according to claim 1.

7. A device for simulating the estimation of a time to acquire satellite images associated with at least one predetermined area of the Earth, by at least one Earth observation satellite comprising an optical imaging system, the predetermined area being previously divided into a grid of cells, the acquisition being scheduled to be triggered starting on an analysis start date, the device comprising:

a memory configured to store:

the grid of cells associated with the predetermined area, the orbital characteristics of the satellite at a current iteration date, the current iteration date corresponding to a date around the analysis start date in a year prior to the year associated with the analysis start date, and at least a first cloudiness value for each of the cells of the grid, the first cloudiness value corresponding to a weather observation and/or forecast respectively observed on the current iteration date or predicted for the current iteration date, a processor coupled to the memory and configured to select a plurality of cells of the grid that are planned to be overflown by the satellite on the current iteration date based on the orbital characteristics of the satellite on the current iteration date, thus obtaining candidate cells, the processor being further configured for:

(a) identifying among the candidate cells, based on a mission plan of the satellite, those for which acquisition of at least one satellite image is scheduled, (b) identifying among the candidate cells, those for which the first associated cloudiness value is above a predetermined validation threshold value, thus obtaining scheduled cells, (c) repeating operations (a) and (b) one or more times until each of the cells of said grid is comprised in the validated cells, taking into consideration in each iteration the cells not identified as validated and a period following the current iteration date considered in the previous iteration, (d) determining the time to acquire satellite images based on the number of iterations carried out during operation (c).

8. The device according to claim 7, wherein:

the memory is further configured to store a second cloudiness value for each of the candidate cells, the second cloudiness value corresponding to a weather observation and/or a weather forecast respectively observed on the current iteration date or predicted for the current iteration date, and, the processor is further configured to identify, among the candidate cells, those for which the second associated cloudiness value is above a predetermined selection threshold value that is different from the predetermined validation threshold value, thus obtaining the candidate cells.

9. The device according to claim 7, wherein the predetermined selection threshold value and the predetermined validation threshold value correspond to a clear sky percentage threshold value.

10. The device according to claim 9, wherein the validation threshold value is greater than the selection threshold value.

11. The device according to claim 7, wherein the processor is further configured to determine, during operation (d), at least one statistical quantity and/or at least one posterior probability based on a plurality of times to acquire satellite images that are determined during operation (c).

* * * * *